J. E. REID AND F. W. SIDE.
DENTAL SWITCHBOARD UNIT.
APPLICATION FILED JUNE 4, 1919.
1,315,330.
Patented Sept. 9, 1919.
2 SHEETS—SHEET 1.
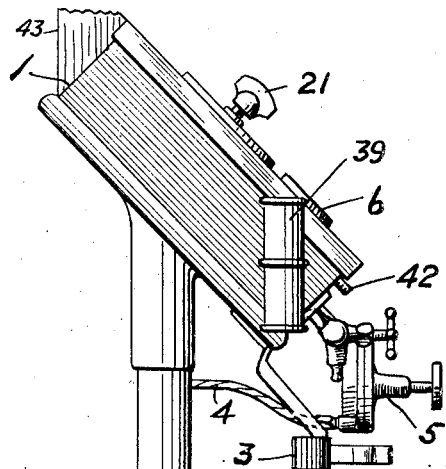
FIG.1.
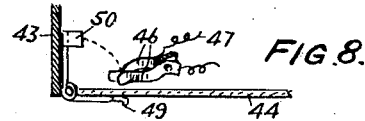
FIG.8.
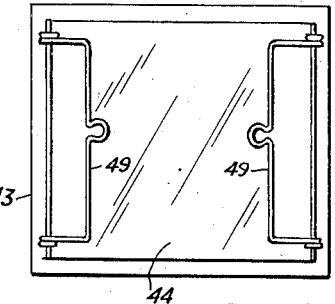
FIG.7.
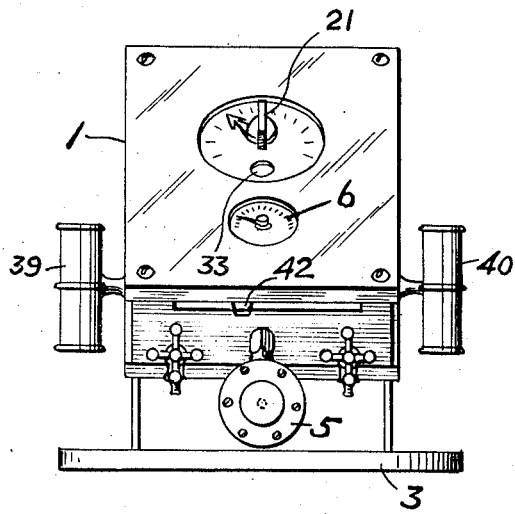
FIG.2.
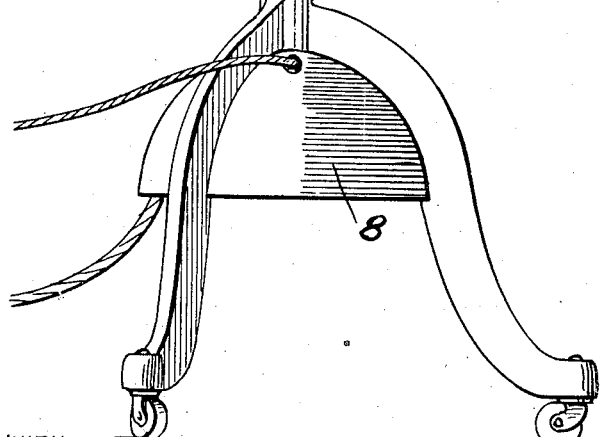
INVENTORS
James E. Reid
Frederick W. Side
BY
Augustus B. Stoughton
ATTORNEY.
WITNESS:

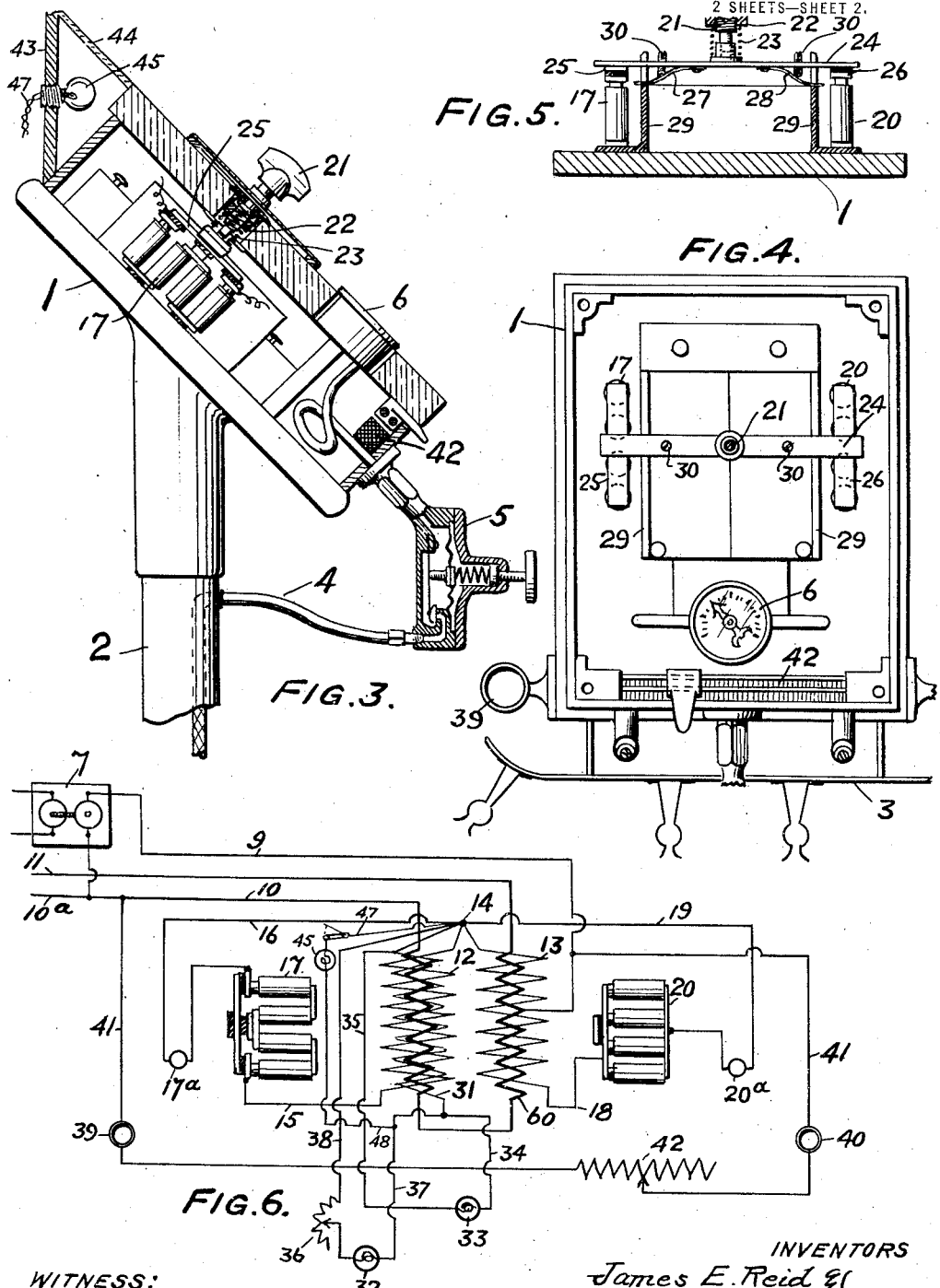

UNITED STATES PATENT OFFICE.

JAMES ERNEST REID, OF MOORESTOWN, AND FREDERICK W. SIDE, OF CAMDEN, NEW JERSEY; SAID SIDE ASSIGNOR TO SAID REID.

DENTAL-SWITCHBOARD UNIT.

1,315,330. Specification of Letters Patent. Patented Sept. 9, 1919.

Application filed June 4, 1919. Serial No. 301,713.

*To all whom it may concern:*

Be it known that we, JAMES E. REID and FREDERICK W. SIDE, citizens of the United States, residing, respectively at Moorestown, Burlington county, New Jersey, and Camden, Camden county, New Jersey, have jointly invented a certain new and useful Dental-Switchboard Unit, of which the following is a specification.

The principal objects of the present invention are, first, to simplify the construction and wiring of the unit while providing the necessary different circuits and adjustments therefor; second, to provide compact electrical equipment so that the same can be housed in a comparatively small stand; third, to simplify and make convenient and reliable the various circuit adjusting appliances; and fourth, to provide an attractive, comparatively inexpensive and efficient switch-board unit for the use of dentists.

The invention will be claimed at the end hereof but will be first described in connection with the embodiment selected as an illustration in the accompanying drawings forming part hereof and in which—

Figure 1, is a side view of a switch-board unit embodying features of the invention.

Fig. 2, is a front view of the stand forming part of the unit.

Fig. 3, is a view drawn to an enlarged scale and illustrating the stand in central section.

Fig. 4, is a top or plan view of the stand.

Fig. 5, is a sectional view showing the carbon pile resistances and the controling means.

Fig. 6, is a diagrammatic view, and

Figs. 7 and 8, are detail section and front views drawn to an enlarged scale and illustrating features of construction hereinafter described.

In the drawings 1, is a stand or housing mounted on a pedestal 2, and shown as fitted with an instrument rack 3, and with air connections 4, including an air regulator 5, and an air pressure gage 6. Within the stand there is a primary winding 60 of a transformer. In cases where the switch-board unit is to be connected with direct current mains, use is made of a rotary converter 7, that may be arranged in the base 8, of the pedestal 2. The alternating current end of the rotary converter 7, may be of comparatively low voltage, for example, seventy volts, and it is connected to include a part of the primary winding 60, as by conductors 9 and 10. When the instrument is connected to alternating current mains, their voltage is usually relatively high, for example, 110 volts, and in that case the whole of the primary winding 60, is connected across the mains as by means of conductors 11, 10 and 10ª. The purpose of this is to adapt the instrument to use on either direct or alternating current mains and to provide in each case the same voltage across various parts of the secondary windings to which various circuits to be presently described are connected. There is a pair of secondary windings 12 and 13, connected together at 14, and each is provided with an instrument circuit, but the conditions in the circuits are not alike. The instrument circuit 15, 16, of the secondary winding or coil 12, is provided with, or includes, a carbon pile resistance 17, in which the piles are in series and also an instrument 17ª, and the instrument circuit 18, 19, of winding 13, is provided with, or includes, a carbon pile resistance 20, in which the piles are in parallel, and also an instrument 20ª. There is a handle 21, accessible from the exterior of the stand or housing 1, and its threaded and turnable shank operates upon a nut 22, which in turn operates upon a spring 23, which transmits pressure to the bridge piece 24, which operates upon the bars 25 and 26, of the carbon piles. Springs 27 and 28, rest upon fixed abutments 29, and distribute or apportion the pressure exerted by the handle 21 between the respective piles. 30, are adjusting screws for changing the degree of pressure to which each carbon pile is subjected for a given movement of the handle 21. The desired difference in the circuits of the instruments 17ª and 20ª, may be established by the adjusting screws 30, and then when the handle 21, is turned each circuit is correspondingly changed. 31, is a third secondary winding across which a lamp circuit is arranged for the mouth lamp 32, and the pilot lamp 33. Pilot lamp 33, is in conductors 34 and 35, and mouth lamp 32 and its rheostat 36, are in circuit 37 and 38. The heating cups 39 and 40, are across the supply circuit by conductor 41, which includes the rheostat 42.

43, is a shadow box for showing an X-ray picture of a tooth upon which an operation is being performed. The glass 44, for the X-ray picture is detachable from the top of the box and is lighted by the lamp 45, in the box. 46, are spring contacts normally touching each other and they are interposed in one of the conductors 47, by which, with conductor 48, the lamp 45, is included in circuit across the secondary winding 31. 49, are turnable clips for detachably holding the X-ray picture, and one of them is shown as provided with an arm carrying an insulating wedge 50, which enters between the contacts 46, and breaks the circuit and extinguishes the lamp 45, when the clip is turned into position for disengaging the picture, so that the lamp is automatically lighted by the operation of turning the clip to hold the X-ray picture in place and is automatically extinguished by the turning of the clip to remove the picture. The location of the lamp 45, in the box 43, in Fig. 3, may be regarded as illustrative for it may be located on the opposite wall or in any convenient location.

From the foregoing description it is evident that the wiring is very simple in view of the number of different circuits that have to be established with different voltages and that the electrical apparatus constituting the contents of the stand 1, is very compact, so that the stand may be conveniently small. Again the adjustments can be conveniently made from the stand and they are very easily and quickly made.

We claim:

1. In a dental switch-board unit the combination of a hollow stand, a plurality of carbon pile resistances arranged in the stand and adapted to establish different heating circuits, a bar common to said piles, a regulating handle accessible from the exterior of the stand, fixed abutments and their complemental springs for apportioning the pressure of the handle between the piles, and separate instrument circuits connected with the carbon piles, substantially as described.

2. In a dental switch-board unit the combination of a hollow stand, secondary windings arranged in the stand, carbon piles in circuit with the secondary windings and arranged in the stand and adapted to establish different heating circuits, mechanism operatable from the exterior of the stand and adapted by changing the pressure on the carbon piles to simultaneously vary their resistance, and instrument circuits connected with the carbon piles, substantially as described.

3. In a dental switch-board unit the combination of a hollow stand, a primary winding in said stand, high voltage connections for including all said winding in a primary circuit, low voltage connections for including a part of said winding in a different primary circuit, a pair of secondary windings, an instrument circuit connected with each secondary winding and provided with a carbon pile resistance arranged in the stand, manual means accessible from the outside of the stand for simultaneously adjusting both carbon pile resistances, a third secondary winding, and a mouth lamp circuit connected with the third secondary winding, substantially as described.

4. In a dental switch-board unit the combination of a hollow stand, a primary winding in said stand, high voltage connections for including all said winding in a primary circuit, low voltage connections for including a part of said winding in a different primary circuit, a pair of secondary windings, an instrument circuit connected with each secondary winding and provided with a carbon pile resistance arranged in the stand, manual means accessible from the outside of the stand for simultaneously adjusting both carbon pile resistances, a third secondary winding, a mouth lamp circuit connected with the third secondary winding, and a cup heating circuit and its regulating resistance connected across a part of the primary winding, substantially as described.

5. In a dental switch-board unit the combination of a hollow stand, a primary winding in said stand, a pair of secondary windings, an instrument circuit connected with each secondary winding and provided with a carbon pile resistance arranged in the stand, manual means accessible from the outside of the stand for simultaneously adjusting both carbon pile resistances, a third secondary winding, and a mouth lamp circuit connected with the third secondary winding, substantially as described.

6. In a dental switch-board unit the combination of a hollow stand, a primary winding in said stand, a pair of secondary windings, an instrument circuit connected with each secondary winding and provided with a carbon pile resistance arranged in the stand, manual means accessible from the outside of the stand for simultaneously adjusting both carbon pile resistances, a third secondary winding, a mouth lamp circuit connected with the third secondary winding, and a cup heating circuit and its regulating resistance connected across a part of the primary winding, substantially as described.

7. In a dental switch-board unit the combination of a hollow stand, a pair of separate instrument circuits, a pair of carbon pile resistances of which one has its piles arranged in series in one of said circuits and of which the other has its piles arranged in parallel in the other of said circuits, and manual pressure means for varying the compression of said piles, substantially as described.

8. In a dental switch-board unit the combination of a hollow stand, a transformer in the stand, an instrument circuit connected with the primary winding of the transformer, a carbon pile resistance in said circuit, and a handle accessible from the exterior of the stand for varying the pressure on the carbon pile resistance.

9. In a dental switch-board unit the combination of a hollow stand provided with a shadow box, a primary winding in said stand, a pair of secondary windings, an instrument circuit connected with each secondary winding and provided with a carbon pile resistance arranged in the stand, manual means accessible from the outside of the stand for simultaneously adjusting both carbon pile resistances, a third secondary winding, a mouth lamp circuit and an automatically controlled shadow box lamp circuit connected with the third secondary winding, and a cup heating circuit and its regulating resistance connected across a part of the primary winding, substantially as described.

JAMES ERNEST REID.
FREDERICK W. SIDE.